(12) United States Patent
Dhablania et al.

(10) Patent No.: US 6,654,774 B1
(45) Date of Patent: Nov. 25, 2003

(54) GENERATION OF SIGN EXTENDED SHIFTED NUMERICAL VALUES

(75) Inventors: Atul Dhablania, San Jose, CA (US); Takumi Maruyama, Los Gatos, CA (US); Robert S. Grondalski, Austin, TX (US)

(73) Assignee: Fujitsu Limited, Kawasaki (JP)

( * ) Notice: Subject to any disclaimer, the term of this patent is extended or adjusted under 35 U.S.C. 154(b) by 490 days.

(21) Appl. No.: 09/670,963

(22) Filed: Sep. 26, 2000

(51) Int. Cl.[7] ................................................. G06F 5/01
(52) U.S. Cl. ..................................................... 708/209
(58) Field of Search ......................................... 708/209

(56) References Cited

U.S. PATENT DOCUMENTS

| 4,890,251 A | * 12/1989 | Nitta et al. | 708/209 |
| 6,009,451 A | * 12/1999 | Burns | 708/525 |
| 6,098,087 A | * 8/2000 | Lemay | 708/209 |

* cited by examiner

Primary Examiner—David H. Malzahn
(74) Attorney, Agent, or Firm—Fenwick & West LLP

(57) ABSTRACT

A computer-implemented method and system for performing an arithmetic shift right by n of an m-bit negative number. A right shifter executes a logical shift right operation on the number to be shifted. A left shifter performs a left shift on an m-bit mask of ones, left shifting the mask by the one's complement of n. An OR operation is then performed on the results of the two shifting operations, producing the desired arithmetic shift right result.

9 Claims, 3 Drawing Sheets

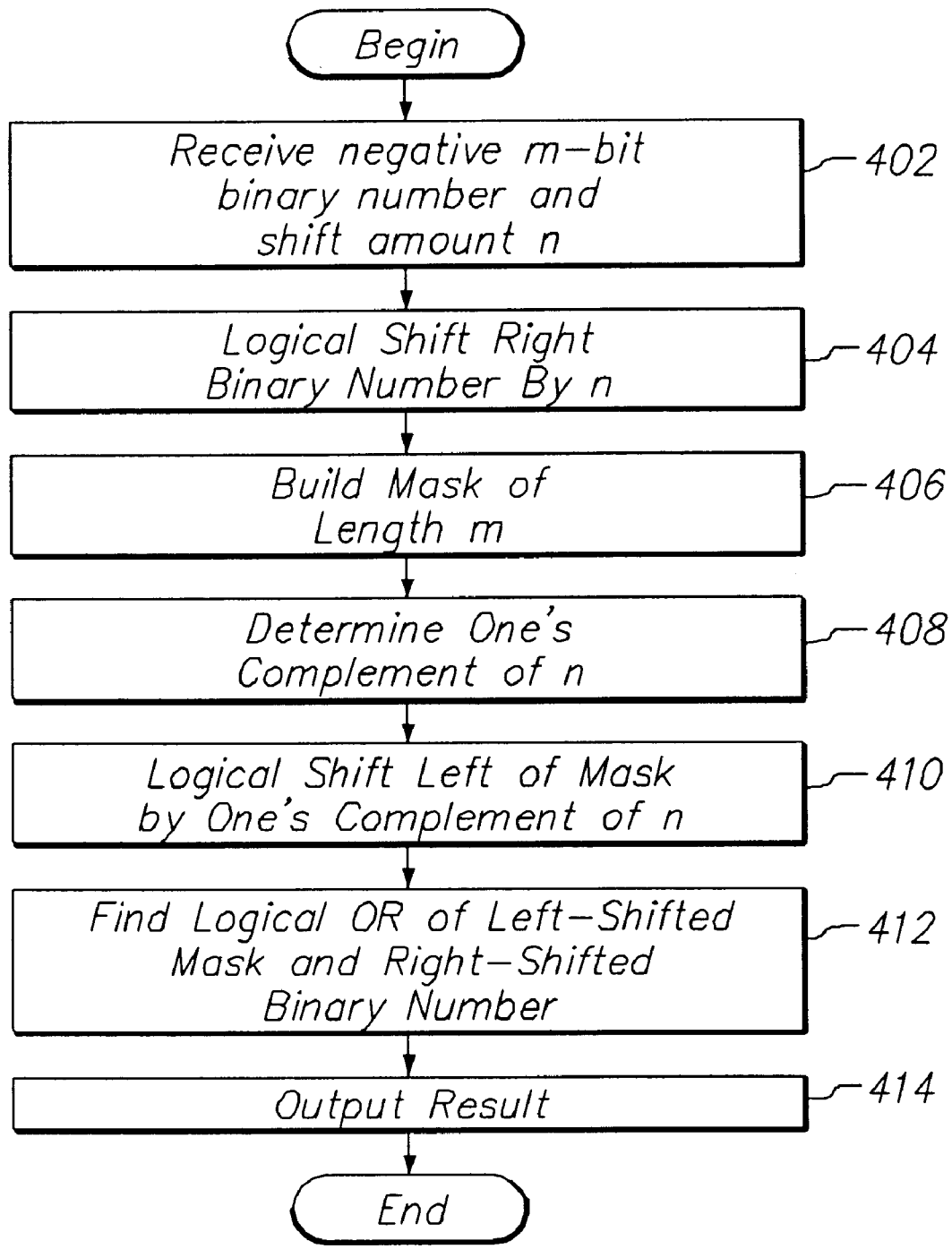

GENERATION OF SIGN EXTENDED SHIFTED NUMERICAL VALUES

BACKGROUND OF THE INVENTION

1. Field of the Invention

The present invention relates generally to arithmetic and logical shifting of numerical values by a computer microprocessor.

2. Description of Background Art

Numerical shift operations are a standard feature of modern microprocessor code. Shifting is useful for performing multiplication and division operations, as well as for various masking and other operations.

There are two kinds of shifting operations: logical shift and arithmetic shift. As is known by those skilled in the art, a logical shift right of an m-bit binary number by a shift amount n results in a new number having zeros in the n-most significant bits, followed by the (m−n)-most significant bits of the original number. For example, if the number 10011011 is shifted right by 3, the result will be 00010011. Similarly, a logical shift left results in a number consisting of the (m−n)-most significant bits, followed by n zeroes. Thus, when 10011011 is shifted left by 3, the result will be 11011000.

Unlike a logical shift right, an arithmetic shift right preserves the most significant bit of a number when doing the shift. Typically, the most significant bit represents the sign (positive or negative) of the number, and the remaining bits specify the magnitude of the number. If the most significant bit is a 1, i.e., the number is negative, then n 1s are inserted into the most significant bits of the number as it is shifted right. For example, in the example above, an arithmetic shift right by 3 of 10011011 would result in 11110011. Note that if the number is positive, an arithmetic shift right will yield exactly the same result as a logical shift right.

In the past, a commonly used microprocessor instruction was the rotate function, which would rotate a number either right or left. For example, a right rotate by 3 of 10011011 would be 01110011. At present, however, the rotate instruction is not commonly used, and is available mainly as a legacy instruction, providing backward compatibility with older microcode. However, the rotators were and are conventionally used to perform the microcode shift operations.

Because a rotator takes up a relatively large surface area, and because an m-bit rotator requires m wires running from the output back to the input, it was desirable to remove at least one of the rotators while still being able to perform both left and right shift operations. This was made possible by the realization that rotating a binary number x right by some amount r is equivalent to rotating x left by the two's complement of r. For example, rotating the number 11010010 right by 3 using a left rotator, is equivalent to rotating the number left by 5, which is the two's complement of 3. Using either method, the result is the same: 01011010. To perform a logical shift using the rotator, zeroes would have to be added either to the most significant bits or least significant bits, for a right or left shift, respectively. And for an arithmetic shift right, ones would have to be added to the most significant bits. Therefore, in addition to the rotator, a masking logic was used to complete the shift operations.

FIG. 1 illustrates a prior art example of a system 100 for performing shifting operations using a left rotator. The system 100 includes a shift amount latch 101, a shift amount 102, a left shift control line 104, a right shift control line 106, a multiplexor 110, two's complement hardware 112, a multiplexor control line 108, a left rotator 114, a masking logic 116, a rotated data output 118, a shift count 120, shifted data 122, a data latch 124, data 125 to be shifted, and a shift amount input 126. Latch 101 is coupled to the left shift control line 104 and right shift control line 106. Left shift control line 104 is in turn coupled to multiplexor 110. Right shift control line 106 is coupled to two's complement hardware 112, which is further coupled to multiplexor 110. Multiplexor control line 108 is additionally coupled to multiplexor 110. Multiplexor 110 is further coupled to left rotator 114, which is also coupled to masking logic 116. Masking logic 116 is further coupled to the rotated data output 118 and shift count 120.

A shift amount 102 is input via latch 101. The shift amount 102 is passed through the left shift control line 104 for left shift operations, or through the right shift control line 106 for right shift operations. The multiplexor 110 is also connected to the multiplexor control line 108, and the output channel of the multiplexor 110 is coupled to the input channel of the left rotator 114, which also receives data 125 to be shifted from latch 124. The output channel of the left rotator 114 sends data to masking logic 116. The masking logic output is shifted data 122.

The shift amount 102 is passed either through data line 104 to be shifted left, or data line 106 to be shifted right. The control line 108 controls which input is used by the multiplexor 110, also known as a mux. For any right shift operation, the shift amount 102 is first converted into its two's complement by the additional two's complement hardware 112 before reaching the mux 110.

While using two's complement eliminates the space needed by a second rotator, the operations of determining a two's complement and performing the masking function are undesirably time consuming and still require a left rotator 114, and a masking logic 116. Therefore, what is needed is a structure and method for performing arithmetic shift right operations that requires less overhead than two's complement structures and operations, while eliminating the need for a rotator, using a small surface area.

BRIEF SUMMARY OF THE INVENTION(S)

In accordance with the present invention, there is provided a structure and method for performing arithmetic shift right operations by n of an m-bit negative number, where n is less than or equal to m-1. The structure includes left and right shifters, a shift count, a logical OR gate, and conventional data pathways. The shifters are connected to a shift count, and configured to receive data to be shifted. The shifters are additionally coupled to an OR gate, which is in turn connected to an output latch. The right shifter executes a logical shift right operation on the number to be shifted. For example, if an m-bit negative number is to be arithmetically shifted right by n, the right shifter logically shifts the m-bit negative number right by n. Then, the one's complement of n is determined, and the left shifter performs a left shift on an m-bit mask of ones, left shifting the mask by the one's complement of n. An OR operation is then performed on the results of the two shifting operations, producing the desired arithmetic shift right result without the need for computing the two's complement of n.

BRIEF DESCRIPTION OF THE SEVERAL VIEWS OF THE DRAWINGS

FIG. 4 is a flowchart of an embodiment of a process for operation of an arithmetic shift right device in accordance with the present invention.

DETAILED DESCRIPTION OF THE INVENTION(S)

The figures depict a preferred embodiment of the present invention for purposes of illustration only. One of skill in the art will readily recognize from the following discussion that alternative embodiments of the structures and methods disclosed herein may be employed without departing from the principles of the claimed invention.

Eliminating Two's Complement

Figure 2:
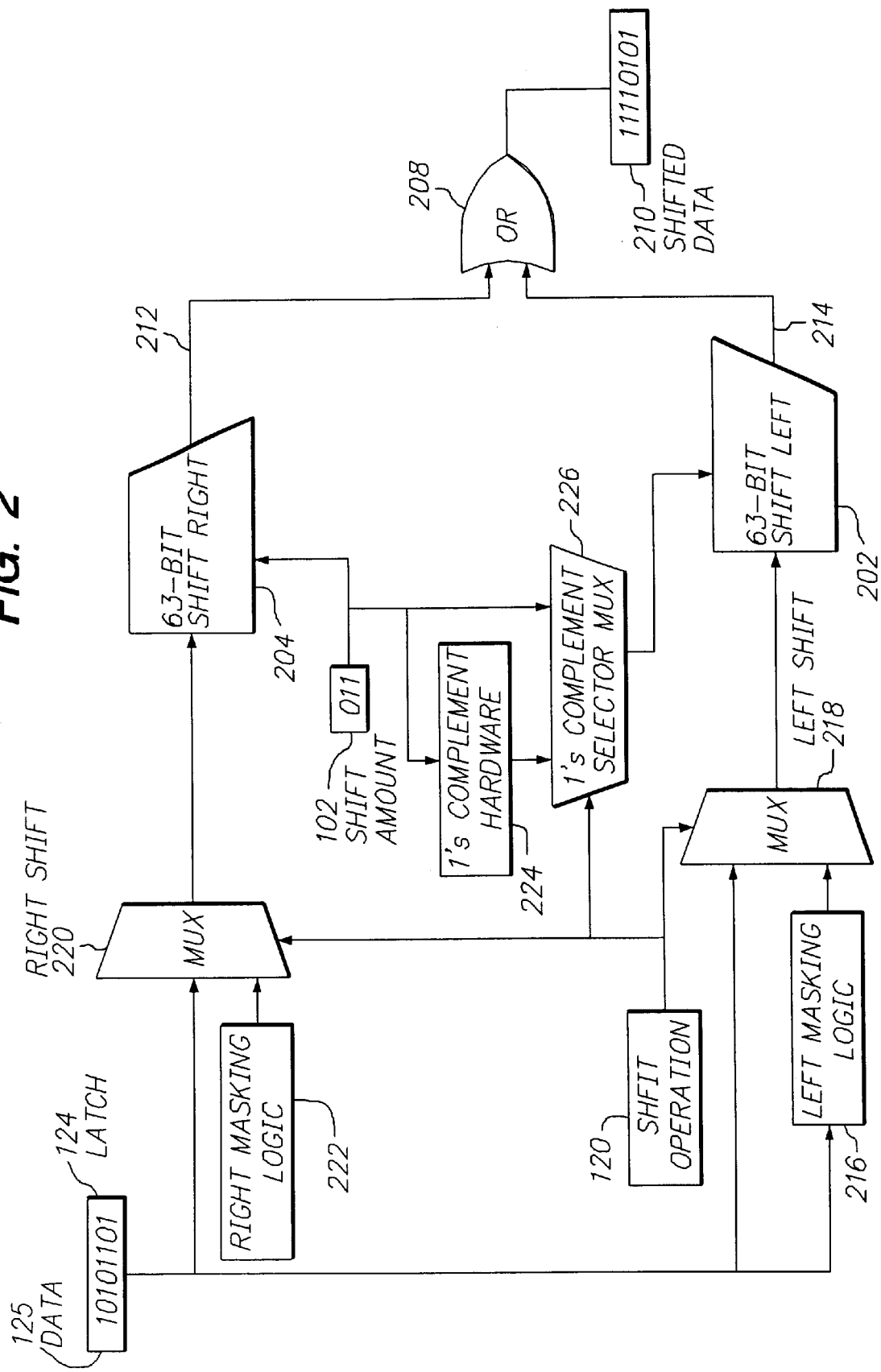
FIG. 2 is a block diagram illustrating one embodiment of a shifting architecture in accordance with the present invention

Referring now to FIG. 2, there is shown a block diagram of the overall architecture of an embodiment of the present invention. While FIG. 2 illustrates a system for performing 63-bit arithmetic shifts right, it will be readily apparent to those skilled in the art that another shift amount could be used. FIG. 2 illustrates latch 124, input data 125, right masking logic 222, right shift mux 220, conventional left 202 and right 204 shifters, shift amount 102, 1's complement hardware 224, 1's complement selector mux 226, shift operation hardware 120, a right shift output 212, a left shift output 214, a left masking logic 216, a mux 218 for left shift operations, an OR gate 208, and a result 210.

The input data 125 is provided through input latch 124, which is coupled to left masking logic 216, left shift mux 218, and right shift mux 220. Left masking logic 216 is further coupled to left shift mux 218. Right shift mux 220 is further coupled to right masking logic 222, shift operation 120, and right shifter 204. Shift operation 120 is additionally coupled to left shift mux 218, and 1's complement selector mux 226. One's complement selector mux 226 is further coupled to 63-bit left shifter 202, 1's complement hardware 224, and shift amount 102. One's complement hardware 224 is additionally coupled to shift amount 102, which is further coupled to right shifter 204. Right shifter 204 is additionally coupled to right shift output 212, further coupled to OR gate 208. Left shifter 202 is also coupled to mux 218, and to left shift output 214, further coupled to OR gate 208, which is in turn coupled to output data 210.

When a number 125 is to be shifted, it is input via latch 124 into the right shift mux device 220. In the case of an arithmetic shift right, right shift mux 220 reads the shift information 120, ignores input from right masking logic 222, and passes data 125 as input to right shifter 204. Conversely, left masking logic 216 generates (creates) a mask of all 1's, and inputs the mask into left shift mux 218. Since shift operation 120 indicates an arithmetic shift right, mux 218 will pass the mask of 1's to left shifter 202. The operation of the logical shift right device 204 is further detailed below with reference to FIG. 3. The shift amount 102, representing the number of bits by which the number 125 is to be shifted right, is also input into the logical shift right device 204, 1's complement selector mux 226, and 1's complement hardware 224. The output of the OR gate 208 will be the original number 125 after an arithmetic shift right by the shift amount 102.

Figure 1:
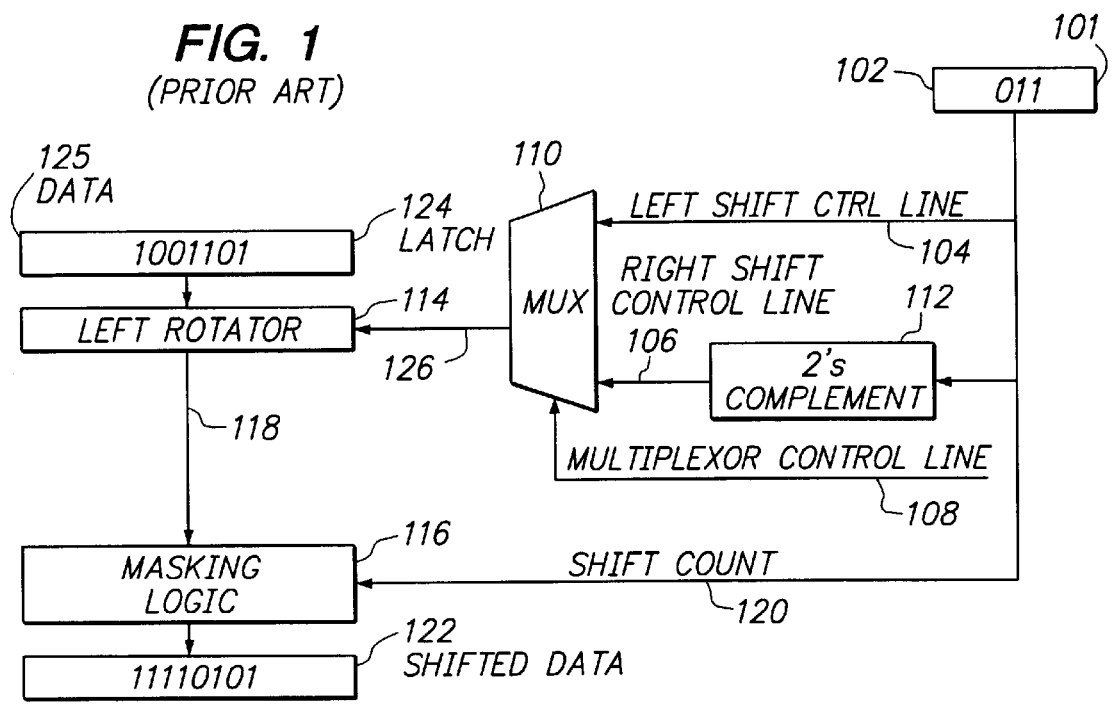
FIG. 1 is a block diagram illustrating prior art.
Figure 3:
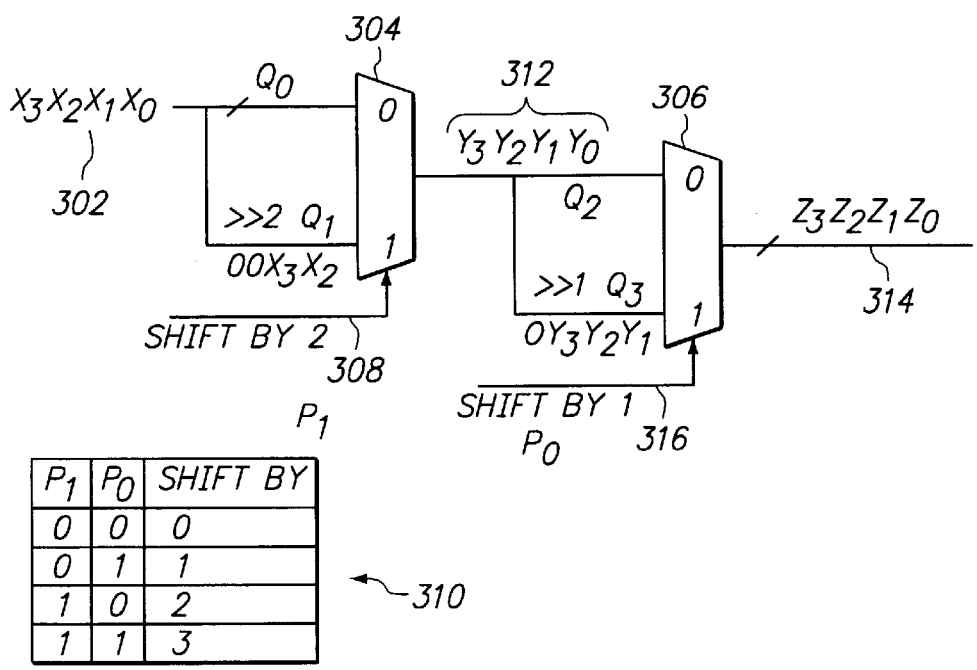
FIG. 3 is a block diagram of an embodiment of a logical shift right device encoded for a shift value of up to three bits in accordance with the present invention.

Referring now to FIG. 3, there is shown one embodiment of a conventional shifter for performing logical right shifting of four-bit numbers by up to two bits. FIG. 3 depicts a shift-by-2 shifter 304, and a shift-by-one shifter 306. FIG. 3 additionally depicts a two-bit shift control amount 308, output 312, and a one bit shift control amount 316. Table 310 provides an illustration of the various inputs to shift control amounts 308, 316. The two-bit shifter 304 is coupled to the one-bit shifter 306. The two-bit shifter 304 receives input of number 302, and of shift control amount 308. The output 312 of shifter 304 serves as an input to shifter 306, as does shift amount 316. Shifter 306 then outputs data 314.

The four-bit number 302 may be represented as $X_3X_2X_1X_0$, and is input into shifter 304. Shifter 304 may perform a logical shift right by 2 bits on number 302, or it may simply leave the number 302 unshifted. Whether or not shifter 304 will perform the shift depends on the input from control line 308. As is illustrated in table 310, if number 302 is to be shifted by either 0 bits or 1 bit, the input signal 308 to shifter 304 will be 0, and no shift will be performed by shifter 304. Alternatively, if a 2 or 3 bit shift is to be performed, input signal 308 will be 1, and shifter 304 will shift number 302 right by two. In either situation, the output 312 of shifter 304 is then passed on as input to shifter 306. The output 312 of shifter 304 can be represented as $Y_3Y_2Y_1Y_0$. Whether any shifting is done by shifter 306 will depend on the input signal from signal 316. Referring again to table 310, it may be seen that signal 316 should be 1 when the desired shift amount for number 302 is either 1 or 3 bits. Signal 316 will be 0 when the desired shift amount for number 302 is 0 or 2. Once the shift has been performed, if required, the resulting number 314 is then output.

The present invention is able to perform an arithmetic shift right without requiring the computation of a two's complement number. Two's complement was useful in the past, because it made possible the use of a single rotator 114 to rotate in both left and right directions, based on the observation that a rotate right by n is equivalent to a rotate left by the two's complement of n. As those skilled in the art will appreciate, however, the rotate operation is no longer required, and is gradually being phased out of microcode instruction sets. Instead of continuing to use valuable space by including a rotator 114 merely to perform shifting operations, the present invention computes logical shifts left and logical shifts right by using a left 202 and right shifter 204, respectively.

In order to perform the arithmetic shift right of a negative number, the 1 in the most significant bit should be sign-extended. This was previously done using a rotator 114 and masking logic 116. In the present invention, however, the need for both is eliminated.

For arithmetic right shifts, while the right shifter 204 is being used to perform a shift, the left shifter 202 is available for other operations. Thus, the overhead of using the otherwise-idle left shifter 202 in parallel with the right shifter 204 is negligible.

As will be recognized by those skilled in the art, when a negative m-bit number 125 is shifted right by n bits, a logical shift right of the same number will have zeroes in the n-most significant bits, and an arithmetic shift right 210 of the same number will have ones in the n-most significant bits. Thus, if the result of the logical shift right operation is known, the arithmetic shift right result 210 can be obtained by changing the n-most significant bits from zeroes to ones. One way in which to accomplish such a change is by executing an OR operation, using a conventional OR gate such as gate 208. The inputs to the operation would be the result 212 of the logical shift right operation, and a mask 214. The mask 214 should be of length m, and will have a 1 in each of its n-most significant bits.

As is known in the art, a mask can be created (generated) by beginning with an m-bit number consisting of ones, and left shifting that number by the two's complement of n. For example, suppose the required operation is to perform an arithmetic shift right by 3 on the negative binary number 10101101 125. A logical shift right by 3 would yield 00010101. The two's complement of 3 is 5, so to get an appropriate mask, 11111111 is shifted left by 5, and the result is 11100000. Taking the OR of the two numbers results in 11110101, which is the correct arithmetic shift right 122 by 3 of the starting number, 10101101 125. While the mask obtained by the method just described will work to determine the correct arithmetic shift right result, it once again requires the calculation of a two's complement number.

Referring now to FIG. 4, there is shown a flowchart of the operation of an embodiment of the present invention. The first step is to receive 402 the negative m-bit binary number 125 and the shift amount n 102. Next, the binary number 125 is logically shifted 404 right by n. An m-bit mask is constructed 406, and the one's complement of the shift amount, n, is determined 408. The mask is then left-shifted 410 by the one's complement of n, and the two numbers are ORed together 412. The result 210 of the OR operation is then output 414.

The present invention overcomes the requirement of computing the two's complement. Instead, the present invention calculates 408 only the one's complement of the right shift amount 102. Because determining the one's complement of a number is simply a matter of negating the number, it is a fast operation, compared to calculating the two's complement of the same number 102. In addition, the one's complement of n will be exactly 1 less than the two's complement of n. In the example given above, the shift amount, n, was 3, and its two's complement was 5. If, instead, the one's complement is calculated, the result is 4. If, in the above example, the m-bit mask consisting of all ones is shifted left by 4 instead of by 5, the mask would then be 11110000 instead of 11100000. The difference between the two results is that shifting using the one's complement results in a zero in the (n+1)$^{th}$-most-significant-bit, instead of a 1, as would be present after shifting left by the two's complement of n. However, this does not present an impediment to obtaining the correct arithmetic shift right result 210, because since the number 125 being arithmetically shifted right is negative, it will always have a 1 in its most significant bit. Thus, after being logically shifted right by n bits, the (n+1)$^{th}$-most-significant-bit of a negative binary number will always be 1. Consequently, for the purpose of an OR operation, it is irrelevant whether the (n+1)$^{th}$ most-significant-bit of the mask is a 1 or a 0, since the (n+1)$^{th}$-most-significant-bit of the number being arithmetically shifted right is always 1, and the result of the OR operation will also always be 1. Therefore, it is not necessary to shift left by the two's complement of n to obtain a mask, but rather only to shift left 410 by the one's complement of n. This can easily be done by the left shifter 202 while the right shifter 204 is doing the primary shift, followed by the OR operation 412 on the two numbers.

From the above description, it will be apparent that the invention disclosed herein provides a novel and advantageous system and method of performing an arithmetic shift right by n of an m-bit negative number. There is no longer a need for a rotator or a special masking logic.

We claim:

1. A method for performing an arithmetic shift right of a negative binary number in a computer microprocessor, comprising:

determining a shift amount by which the binary number is to be arithmetically shifted right;

determining a one's complement of the shift amount;

generating a mask of a length equal to a length of the binary number;

performing a logical shift right on the binary number by the shift amount;

performing a logical shift left on the mask by the one's complement of the shift amount; and performing a logical OR operation, using as inputs to the operation the shifted binary number and the shifted mask.

2. The method of claim 1, wherein the shift amount is specified by a user.

3. A method for right shifting a negative binary number by a shift amount, the method comprising the steps of:

determining a one's complement of the shift amount;

generating a mask for converting a logical shift result into an arithmetic shift result;

logically shifting the binary number right by the shift amount;

logically shifting the mask left by the one's complement of the shift amount;

determining the logical OR of the shifted binary number and the shifted mask.

4. The method of claim 3 wherein the mask is of a length equal to a length of the binary number.

5. A system for performing an arithmetic shift right of a negative binary number in a computer microprocessor, comprising:

a right shifting apparatus for performing logical shift right operations on binary numbers;

a left shifting apparatus for performing logical shift left operations on binary numbers;

a shift count control, coupled to the left shifting apparatus and the right shifting apparatus, and for configuring the left shifting apparatus and the right shifting apparatus; and an OR gate, configured to receive input from the right shifting apparatus and the left shifting apparatus, and to output a logical OR of the two inputs.

6. The system of claim 5 further comprising a first masking apparatus coupled to the left shifting apparatus for generating a mask of a predetermined length.

7. The system of claim 6 further comprising a second masking apparatus coupled to the right shifting apparatus for generating a mask of a predetermined length.

8. The system of claim 6 wherein the predetermined length of the mask is equal to a length of the binary number being shifted.

9. A system for performing an arithmetic shift right of a negative binary number in a computer microprocessor, comprising:

first determining means, for determining a one's complement of a shift amount by which the binary number is to be arithmetically shifted right;

first performing means, for performing a logical shift right on the binary number by the shift amount;

second performing means for performing a logical shift left on a mask by the one's complement of the shift amount, the mask equal in length to the length of the binary number; and a comparator to determine a logical OR of the shifted binary number and the shifted mask.

* * * * *